United States Patent [19]
van Tilburg

[11] 3,714,687
[45] Feb. 6, 1973

[54] METHOD OF BIAXIALLY DEFORMING SHEET MATERIAL

[75] Inventor: Jan van Tilburg, Alkmaar, Netherlands

[73] Assignee: American Can Company, Greenwich, Conn.

[22] Filed: Feb. 3, 1970

[21] Appl. No.: 8,342

[30] Foreign Application Priority Data

Feb. 17, 1969 Great Britain.......................8,473/68
Feb. 11, 1969 Great Britain.....................72,902/69
March 27, 1969 Great Britain.....................16,181/69

[52] U.S. Cl.................................................28/72.1
[51] Int. Cl............................D02g 1/00, D02g 1/14
[58] Field of Search............28/1.8, 1.2, 72.15, 72.1; 156/219, 498; 101/3, 5; 264/293

[56] References Cited

UNITED STATES PATENTS

| | | | |
|---|---|---|---|
| 3,488,415 | 1/1970 | Patchell et al. | 264/289 X |
| 3,632,716 | 1/1972 | Fairbanks | 264/289 X |
| 2,204,341 | 6/1940 | Cobb | 28/72.15 X |
| 2,294,957 | 9/1942 | Caldwell | 28/72.15 X |
| 2,435,891 | 2/1948 | Lodge | 28/72.15 X |
| 2,627,644 | 2/1953 | Foster | 28/72.15 X |
| 2,668,430 | 2/1954 | Laros | 28/72.15 X |
| 3,336,645 | 8/1967 | Mirsky | 28/1.8 |
| 3,399,101 | 8/1968 | Magid | 156/219 X |
| 3,444,035 | 5/1969 | Bushnell | 156/219 X |
| 3,446,685 | 5/1969 | Goldstone et al. | 156/219 |
| 3,514,362 | 5/1970 | Chavannes | 156/219 X |

*Primary Examiner*—Louis K. Rimrodt
*Attorney*—Robert P. Auber

[57] ABSTRACT

Sheet material is deformed, for example crimped or bulked by feeding it to the surface of a rotating roll having a multiplicity of depressions in its surface and pressing the material against the roll surface, the material being fed to the roll at a rate exceeding the linear peripheral speed of the roll. Examples of materials which may be so deformed are filaments consisting of or containing thermoplastic polymers, woven and non-woven fabrics, thermoplastic sheets, paper and metal foils. Preferably, the roll surface consists of sintered particulate material, the depressions being the voids between adjacent particles.

16 Claims, 14 Drawing Figures

PATENTED FEB 6 1973 3,714,687
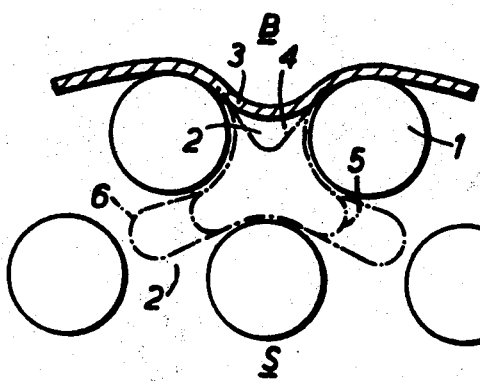
FIG. 1.
 
FIG. 2.   FIG. 3.
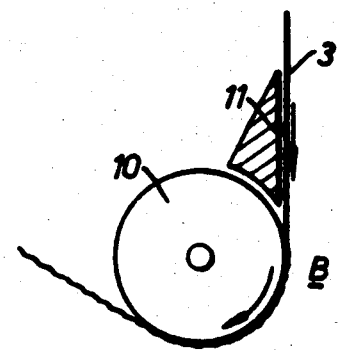 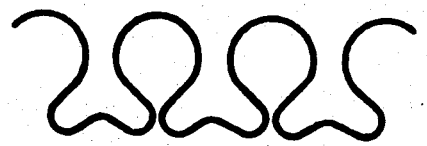
FIG. 4.   FIG. 5.
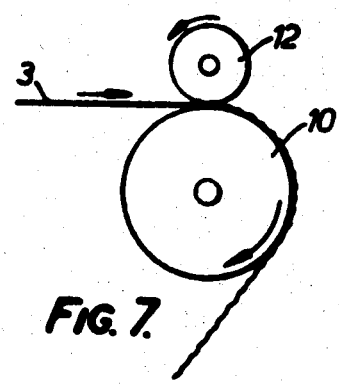
FIG. 6.   FIG. 7.
FIG. 8.
INVENTOR
JAN VAN TILBURG
BY
ATTORNEYS

PATENTED FEB 6 1973 3,714,687

INVENTOR
JAN VAN TILBURG
BY Bacon & Thomas
ATTORNEYS

METHOD OF BIAXIALLY DEFORMING SHEET MATERIAL

This invention is concerned with a method of deforming filamentary and sheet material.

According to the invention, there is provided a method of deforming filamentary and sheet material (as herein defined) which comprises feeding the material to a rotating roll at a rate exceeding the linear peripheral speed of the roll, and pressing the material into contact with the curved surface of the roll, which surface is provided with a multiplicity of depressions.

By "filamentary and sheet material" is meant thermoplastic filaments, yarns consisting of or comprising thermoplastic filaments or fibers, knitted fabrics, woven and non-woven fabrics, thermoplastic tapes and films and paper and metal foils.

In the method of the invention, the material is deformed by being pressed into the depressions on the roll surface and the precise nature of the deformation depends, inter alia, on the size and distribution of the depressions, the pressure applied to the material and the feed rate of material to the roll.

The size and distribution of the depressions on the roll surface may vary widely. For example, the depressions may be very small in cross-sectional area so that there are hundreds or thousands per square inch of roll surface. Alternatively, they may be relatively large and take the form of, for example, grooves extending across the surface of the roll. Depressions of a size intermediate these two examples may be used and the depressions need not all be the same size. The depressions may be regularly or irregularly spaced on the roll surface.

The shape of the depressions can vary widely and the depressions may be shallow or deep. In the latter case when the roll is a cylinder, the depressions may take the form of holes in the cylinder wall. The presence of sharp edges on the roll surface should, of course, be avoided since these may tend to tear the material being deformed.

The depressions may be formed on a roll surface in any suitable manner such as by etching or machining. However, when it is desired that the roll surface should contain a very large number of small cross-sectional area depressions, a roll having a surface formed of sintered particulate material is particularly satisfactory. The surface portion of such a roll consists of a very large number of particles sintered together with voids or cavities between adjacent particles, which cavities form the surface depressions.

Rolls having such sintered surfaces can be prepared by known techniques and the size of the depressions or cavities controlled by varying the size of the particles. For example, surfaces can be produced with from less than 10,000 to more than 200,000 cavities per square inch. Suitable particulate materials for these surfaces include metals and alloys such as bronze and polymeric materials such as polytetrafluoroethylene.

When sheet material is treated by the process of the invention, it may be deformed either monoaxially or biaxially depending on the nature and arrangement of the depressions on the roll surface. For example, when a grooved roll is used with the grooves extending parallel to the roll axis, and the roll axis is perpendicular to the direction of movement of the material, only the length (and not the width) of the material is reduced by the deformation process. The material has been monoaxially deformed and the stretchability of the material is then only increased along one axis (its length). When, however, the multiplicity of depressions are arranged so that both the width and length of the sheet material are reduced in the deformation step, the stretchability is increased along two axes and the material is said to be biaxially deformed. A sintered roll surface results in biaxial deformation.

The method of the invention is particularly useful for imparting mono- or bi-axial stretchability to materials.

The pressure applied to the material whilst it is in contact with the roll also affects the type and degree of deformation obtained. The material may be pressed against the roll surface and into the depressions in any suitable manner such as, for example, by gas pressure. Gas pressure may be applied by increasing the gas pressure on the outside of the material and/or, in the case of a cylindrical roll in which the depressions or cavities extend through the cylinder wall, by reducing the gas pressure within the roll.

Alternatively, or in addition, the material may be pressed against the roll surface and into the depressions by means of an auxiliary rotating roll or moving belt. The auxiliary roll (or belt) is rotated at a speed higher than the linear peripheral speed of the main roll so as to force or stuff the material into the depressions. The auxiliary roll may have a smooth continuous surface which may, for example, be of metal or a resilient material such as rubber, or it may have depressions, for example it may be formed of sintered particles similar to the main roll.

The feed rate of material to the roll must be greater than the linear peripheral speed of the roll and high enough to provide sufficient material at the roll surface for the desired deformation.

According to a modification of the process of the invention, the material is deformed in two or more steps, i.e., by contacting it two or more times with the same roll or with two or more different rolls.

Examples of materials which may be deformed by the method of this invention include thermoplastic filaments and yarns such as nylon, polypropylene, glass and metal; woven (or knitted) and non-woven fabrics; thermoplastic tapes and films such as polyethylene or polypropylene film; paper; and metal foils such as aluminum foil. When paper is deformed by the method of the invention, the paper is preferably treated whilst it is slightly damp.

With certain materials such as those containing thermoplastic polymers, it may be desirable to set the deformation. This may be effected by heating the material prior to, or during, the deformation and subsequently allowing the material to cool in the deformed condition. The material may be heated during the deformation by, for example, using hot gas to press the material against the roll surface or by using a heated roll.

The deformation may be "set" in metal foils by, for example, coating the deformed foil with a stretchable adhesive or film so that when the coated deformed foil is stretched and released, it will return to its original deformed configuration.

The material treated by the method of the invention may be a laminate. Alternatively, lamination may be effected simultaneously with the deformation by, for example, feeding to the roll surface two layers of material, one superimposed on the other so that the layers become laminated by mechanical interlocking as a result of the deformation.

Various types of deformation can be formed by the process of the invention. For example, the material may be crimped either monoaxially or biaxially. The degree of crimping can be varied by varying the rate of feed of material, the pressure and the size and distribution of the depressions. The size or depth of the crimp also depends on these factors, particularly on the depth of the depressions in the roll surface.

When fibrous sheet material is treated in the process of the invention, it is possible to effect bulking, that is to decrease (not increase) the bulk density of the material. By selecting the appropriate depression dimensions on the roll surface (the depth and the length in the machine direction are particularly important), the feed rate and the pressure, it is possible to produce biaxially stretchable very light-weight non-woven fabric materials and biaxially stretchable light-weight "foamed" paper which has heat insulating properties. Mono-axially stretchable bulked fibrous materials may also be made in a similar manner.

In the case of non-woven fiber sheets, it is possible by the process of the invention to effect a re-arrangement of the fibers. For example, a non-woven, unbonded, slightly bonded or fully bonded sheet of fibers in which the fibers are arranged in the machine direction may be deformed using a sintered roll surface, to form an "open weave" product. The product may then itself be bonded or treated to set the deformation.

When thermoplastic films are treated by the method of the invention, a deformed material which is fabric— or foam-like may be formed. When a lengthwise highly oriented film is used, deformation may also result in lengthwise splitting of the film and, through intertwining, in the formation of a fabric-like structure.

It is to be understood that the type of deformation produced by the method of this invention and the resulting effect thereof on the material, may vary widely. Routine variation in the process parameters can produce widely differing effects but selection of the desired deformation and the optimum conditions appropriate therefor can readily be made by trial and experiment by one skilled in the art.

In the case of thermoplastic materials, the material is preferably heated before contact with the roll to facilitate deformation of the material.

In order that the invention may be more fully understood, reference is made to the accompanying drawings, in which FIG. 1 is an enlarged section of part of the sintered surface of a roll also showing the material being deformed;

FIG. 2–5 and 8 are cross sections through deformed material showing the configuration of the deformation;

FIG. 6 is a schematic sectional view of material being deformed continuously on a roll;

FIG. 7 is a schematic sectional view similar to FIG. 6, with the material pressed against the main roll by means of an auxiliary roll;

Figure 9:
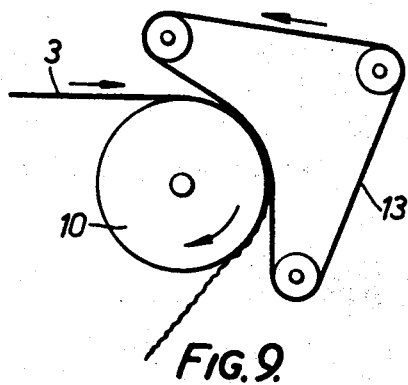
FIG. 9 is similar to FIG. 7 but illustrates the use of a belt in place of the auxiliary roll.

Referring to FIG. 1 of the drawings, part of the roll surface is shown as comprising a number (five) of particles 1 which touch, and are sintered to, other similar particles (not shown). Depressions or cavities 2 are formed between the particles and the material to be deformed 3 (shown as, for simplicity, a thermoplastic filament) is pressed into these depressions to an extent depending on the pressure and the rate of feed of material. The varying degrees and type of deformation obtainable are illustrated by the discontinuous lines 4, 5 and 6 which show the possible positions of the material for different degrees of deformation. The deformed material obtained is illustrated in FIGS. 2 to 5, FIG. 2 showing the deformation obtained when the material is in the main position shown in FIG. 1 and FIGS. 3 to 5 showing the crimp when the material is in positions 4, 5 and 6 (respectively) in FIG. 1.

In the arrangement shown in FIG. 1, the material is suitably pressed against the sintered particle roll surface by gas pressure by increasing the pressure at B and/or reducing the pressure at S.

In FIG. 6 of the drawings, the rotating roll 10 has a multiplicity of depressions on its surface and the material 3 is pressed against the surface by gas pressure at B. A guide surface 11 is provided for the material to be deformed.

FIG. 7 illustrates the use of an auxiliary roll 12 to press the material against the surface of roll 10. The direction of rotation of the rolls 10 and 12 and the direction of movement of the material 3 are shown by arrows.

FIG. 9 illustrates the use of a belt 13 in place of the auxiliary roll 12. One advantage of using such a belt is that it exerts a pressure on the material 3 over a much greater area of the roll 10 than does a single auxiliary roll.

The shape of the deformation of a filament can be relatively simple, as shown for example in FIGS. 2 and 3, or it can be relatively complex as shown in FIGS. 5 and 8.

Figure 10:
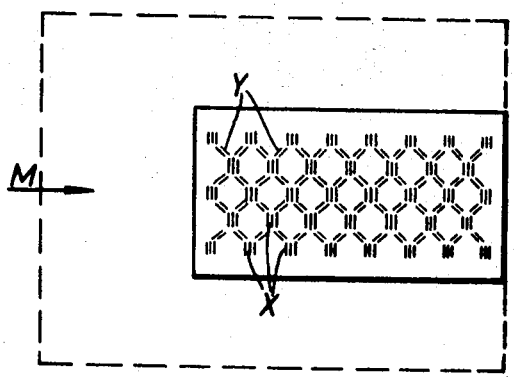
FIG. 10 shows in plan view a thermoplastic film which has been deformed by the method of the invention.

FIG. 10 illustrates the biaxial deformation of a thermoplastic film (in which the deformation has been set). The deformed film is fabric-like and highly stretchable. The solid lines indicate the dimensions of the deformed film and the dashed lines the original dimensions of the sheet before deformation. The roll surface used had depressions causing deformation at points X and the lines Y indicate creases or folds arising from deformation at the points X. The machine direction (M) is indicated by the arrow.

Figure 11:
FIG. 11 is a schematic sectional view of paper which has been bulked by the method of the invention.

FIG. 11 illustrates (in cross-section) paper which has become bulked or "blown up" by the method of the invention. In this case, the paper has been passed over a roller formed with grooves extending parallel to the axis of the roller and perpendicular to the machine direction. The paper is thus mono-axially deformed.

Figure 12:
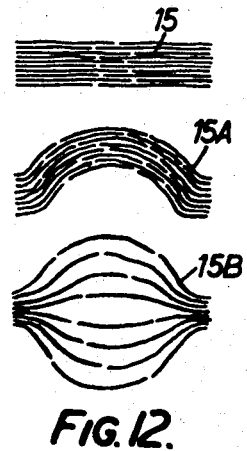
FIG. 12 illustrates the bulking of fibrous sheet material.

The principle of bulking of fibrous sheets is illustrated in FIG. 12 which shows a bundle of fibers 15 which, when treated by the method of the invention, assume the shape 15A or 15B depending on whether the bundle is relatively long or short, respectively. In the first case 15A, all the fibers are deformed in the same direction, but in the second case the fibers go in different directions causing a bulking effect 15B.

Figure 13:
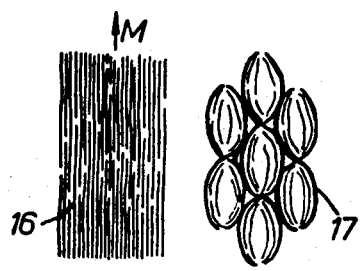
FIG. 13 illustrates the rearrangement of fibers effected by the method of the invention.

FIG. 13 illustrates the rearrangement of fibers which can be effected by the method of the present invention. A non-woven sheet of fibers 16 in which the fibers are predominantly arranged in the machine direction M is treated by the method of the invention using a sintered surface roller. An "open-weave" type product is obtained 17.

Figure 14:
FIG. 14 illustrates, in plan view, various possible shapes for the depressions on the roll surface.

FIG. 14 illustrates various shapes (in plan view) of the depressions which may be used on the surface of the roll.

The deformed material may be subjected to an after-treatment such as cold or hot rolling. The material, before being deformed, may be subjected to a pre-treatment, for example thermoplastic films may be perforated before deformation.

What I claim is:

1. A method of imparting biaxial stretchability to sheet material which comprises feeding the material to a rotating roll provided with a multiplicity of depressions at a rate exceeding the linear peripheral speed of the roll, and pressing the material into contact with the curved surface of the roll and into the depressions to deform the sheet material so that both the length and width of the material are reduced by the deformation step.

2. A method according to claim 1 wherein the material is pressed against the surface of the roll by gas pressure.

3. A method according to claim 1 wherein the curved surface of the roll is formed of sintered particulate matter.

4. A method according to claim 3 wherein the particulate matter is bronze.

5. A method according to claim 1 wherein the depressions have been formed in the surface of the roll by etching.

6. A method according to claim 5 wherein the material is pressed against the surface of the roll by an auxiliary rotating roll.

7. A method according to claim 6 wherein the linear peripheral speed of the auxiliary roll is greater than the linear peripheral speed of the said roll.

8. A method according to claim 7 wherein the said auxiliary roll has a resilient rubber curved surface.

9. A method according to claim 7 wherein said auxiliary roll also has a surface provided with a multiplicity of depressions.

10. A method of biaxially deforming sheet material which comprises heating the material, at a temperature sufficiently high to allow deformation thereof, to a rotating roll provided with a multiplicity of depressions at a rate exceeding the linear peripheral speed of the roll, and pressing the material into contact with the curved surface of the roll and into the depressions whereby the material is crimped and bulked.

11. A method according to claim 10 wherein the material is pressed against the surface of the roll by the pressure of hot gas which serves also to heat the material.

12. A method according to claim 10 wherein the curved surface of the roll is formed of sintered particulate matter.

13. A method according to claim 12 wherein the particulate matter is polytetrafluoroethylene.

14. A method according to claim 10 wherein the depressions have been formed in the surface of the roll by machining.

15. A method according to claim 14 wherein the material is pressed against the surface of the roll by an auxiliary rotating roll.

16. A method according to claim 15 wherein the linear peripheral speed of the auxiliary roll is greater than the linear peripheral speed of the said roll.

* * * * *